United States Patent [19]

Honikman

[11] 4,133,338

[45] Jan. 9, 1979

[54] FREEZE PROTECTION FOR SOLAR HEATING SYSTEMS

[75] Inventor: Terence C. Honikman, Santa Barbara, Calif.

[73] Assignee: Allen K. Cooper, Santa Barbara, Calif. ; a part interest

[21] Appl. No.: 829,730

[22] Filed: Sep. 1, 1977

[51] Int. Cl.² .............................................. F24J 3/02
[52] U.S. Cl. .................................. 126/271; 237/1 A; 137/62
[58] Field of Search .................. 126/270, 271; 60/641; 237/1 A; 137/62

[56] References Cited

U.S. PATENT DOCUMENTS

| | | | |
|---|---|---|---|
| 2,469,496 | 5/1949 | Christenson | 126/271 |
| 3,970,069 | 7/1976 | Pickett | 126/271 |
| 3,986,489 | 10/1976 | Schlesinger | 126/271 |
| 3,989,032 | 11/1976 | Harrison | 126/271 |
| 4,019,495 | 4/1977 | Frazier et al. | 237/1 A |
| 4,027,821 | 6/1977 | Hayes et al. | 126/271 |
| 4,044,754 | 8/1977 | Cronin et al. | 126/271 |

Primary Examiner—Kenneth W. Sprague
Attorney, Agent, or Firm—Frederick E. Mueller

[57] ABSTRACT

Redundant freeze protection having primary and secondary protection modes is provided for a solar heating system, such as a solar water heating system, of the kind whose normal operation involves circulation of a heat transport liquid through a solar collector and a solar energy storage tank to store solar thermal energy in the tank. The primary protection mode is triggered in response to the collector liquid temperature, $T_c$, dropping to a selected freeze protection trigger level, $T_f$, and involves termination of liquid circulation through and draining of liquid from the collector. The secondary or back up freeze protection mode occurs upon failure of the collector drainage means to drain the collector in the primary mode in response to the freeze protection trigger condition $T_c \leq T_f$ and involves continued circulation of liquid through the collector and solar energy storage tank to warm the collector.

17 Claims, 1 Drawing Figure

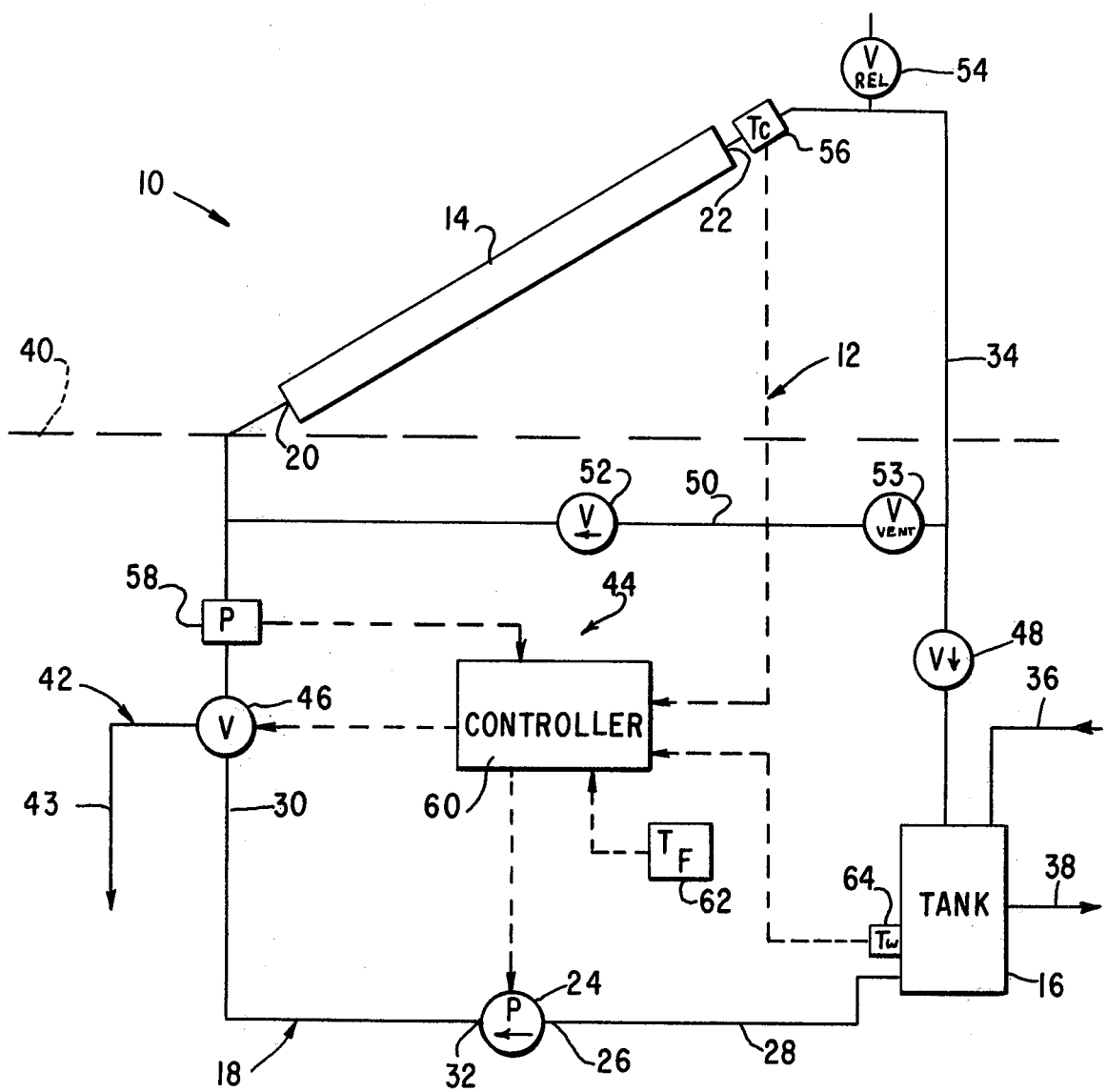

FREEZE PROTECTION FOR SOLAR HEATING SYSTEMS

RELATED APPLICATIONS

Reference is made herein to co-pending application Ser. No. 677,912 entitled "Solar Energy Augmented Water Heating System" assigned to the same assignee as this application.

BACKGROUND OF THE INVENTION

Field of the Invention

This invention relates generally to solar heating systems of a kind whose normal operation involves circulation of a heat transport liquid through a solar collector and a storage tank to store solar thermal energy in the tank. The invention relates more particularly to a redundant freeze protection method and system for such solar heating systems.

Prior Art

As will appear from the ensuing description, the present freeze protection invention may be utilized in a variety of solar heating systems of the class described. The invention, however, is intended primarily for use in a solar water heating system and will be described in this context.

Simply stated, a solar heating system of the kind to which this invention pertains comprises a solar collector, a storage tank, and means for circulating a heat transport liquid through the collector and tank to transfer solar thermal energy from the collector to the tank. In a solar water heating system, a hot water storage tank contains water which is heated by the solar energy transferred to the tank.

There are two general types of solar water heating systems, commonly referred to as "direct" and "indirect" types. In the direct system, potable water from the supply main constitutes the heat transport liquid which circulates through the solar collector and the hot water tank to the point of use and is consumed by the user. In contrast, in the indirect system, the heat transport liquid is a separate liquid which circulates through a closed loop including the solar collector and a heat exchanger through which thermal energy is transferred to the water in the tank. As will appear from the ensuing description, the present freeze protection invention is utilized in the direct type of solar water heating system.

The prior art is replete with a vast assortment of solar water heating systems of the character described. One such system is described in the earlier referenced co-pending application. Other systems are described in U.S. Pat. Nos. 3,812,872; 3,989,032; 4,015,962; 4,019,495.

Solar water heating systems of the kind to which this invention pertains are subject to one problem to which this invention is addressed, i.e., freezing of the heat transport liquid in the solar collector. This problem arises, of course, due to the fact that the solar collector is exposed directly to the atmosphere and hence the liquid in the collector is subject to freezing when the air temperature approaches, drops to, or is below freezing.

A variety of freeze protection methods and systems have been devised to either prevent or accomodate freezing of the collector liquid. One common method of freeze protection, for example, involves circulation of liquid through the storage tank and solar collector to heat and thereby prevent freezing of liquid in the collector. The referenced co-pending application embodies this type of freeze protection. While satisfactory, at least to a limited extent, this method of freeze protection is subject to the disadvantage that it consumes or wastes the stored thermal energy. Depending upon the duration of the freeze conditions, the air temperature, and the total quantity of thermal energy stored, the stored energy may be totally depleted and, if not augmented by additional energy input, freezing of the collector liquid may occur.

The patents listed earlier teach a second method of freeze protection involving draining of liquid from the solar collector. This avoids the stored energy depletion problem associated with the collector heating method of freeze protection, but introduces another potential problem, which is the possibility of failure of the collector drainage means to drain the solar collector.

Accordingly, neither of the above described freeze protection methods is totally satisfactory. An improved method of freeze protection is thus needed.

SUMMARY OF THE INVENTION

The present invention provides an improved and redundant freeze protection method and system for solar heating systems, particularly solar water systems, of the character described. This redundant freeze protection invention effectively utilizes both the solar collector draining and solar collector heating freeze protection techniques discussed above, while avoiding or at least minimizing their disadvantages.

To this end, the invention provides both primary and secondary or back-up freeze protection for the solar heating system. Primary freeze protection is triggered in response to the collector liquid temperature, $T_c$, dropping to a selected freeze protection trigger level $T_f$ above the liquid freezing point and involves both inactivation of the liquid circulating means to terminate circulation of heat transport liquid through the solar collector and actuation of a collector drainage means to a dump state to drain liquid from the collector. If the redundant freeze protection system functions properly in this primary protection mode, all liquid is drained from the solar collector to avoid the possibility of liquid freezing in the collector and the secondary or back-up freeze protection mode is never utilized.

This secondary or back-up protection mode occurs only upon failure of the collector drainage means to assume its dump state and thereby drain the collector in the primary protection mode in response to the freeze protection trigger condition $T_c \leq T_f$. The secondary freeze protection mode involves continued operation of the liquid circulating means to continue circulation of heat transport liquid through the storage tank and the solar collector to warm the collector.

As noted earlier, the preferred embodiment of the invention is a direct type solar water heating system. In this preferred system, the heat transport liquid which circulates through the solar collector and the solar energy storage tank is potable water which is received from the water main and consumed by the user.

BRIEF DESCRIPTION OF THE DRAWINGS

The single FIGURE of the drawing schematically illustrates a direct type solar water heating system embodying the present redundant freeze protection invention.

DESCRIPTION OF THE PREFERRED EMBODIMENT

The single drawing FIGURE illustrates a solar heating system 10, in this instance a solar water heating system, embodying a redundant freeze protection system 12 according to the invention. Except for its freeze protection system 12, the solar heating system 10 is conventional, and hence need not be described in elaborate detail.

With this in mind, solar water heating system 10 comprises a solar collector 14, a solar energy storage tank 16, and means 18 for circulating heat transport liquid through the collector and tank to effect solar heating of water in the tank. Solar collector 14 has an inlet 20, an outlet 22, and a liquid conductor (not shown) for conducting liquid from the inlet to the outlet. This conductor is exposed to the solar energy incident on the collector for solar heating of the liquid passing through the conductor.

The liquid circulating means 18 includes a pump 24 having an inlet 26 connected by a flow line 28 to the storage tank 16. A flow line 30 connects the pump outlet 32 to the inlet 20 of the solar collector 14. The collector outlet 22 connects via a flow line 34 to the storage tank 16.

Storage tank 16 is connected by a supply line 36 to a source of liquid to be heated, in this instance water. A hot water service line 38 extends from the tank. In a typical installation, the solar collector 14 is located externally of the building 40 in which the hot water is to be used. The remaining system components are located within the building.

During normal operation of the solar water heating system 10, heat transport liquid is circulated by the pump 24 through the solar collector 14 and tank 16 to heat the water in the tank. As noted earlier, the particular solar water heating system shown is assumed to be a "direct" type system in which the heat transport liquid which circulates through the solar collector is the same water which is supplied to the tank 16 through the supply line 36 and delivered to the point of use through the service line 38. This direct system is preferred for the reason that it avoids both the legal code requirements placed on the heat exchanger of "indirect" type solar water heating systems and the heat transfer problems associated with these latter systems.

Being located externally of the building 40, the solar collector 14 is exposed to the outside air temperature and is thus subject to freezing of its contained liquid (water) when the air temperature approaches, drops to, or is below freezing. Unless the solar collector is designed to withstand such freezing, expansion of the water in the collector as it freezes may damage the collector. The redundant freeze protection system 12 of this invention avoids this freezing problem and constitutes the major contribution of the invention.

In general terms, the redundant freeze protection system 12 comprises collector drainage means 42 having normal and dump states and operable in its normal state to permit water circulation through the solar collector 14 and storage tank 16 by the water circulating means 18, as explained earlier. In its dump state, the collector drainage means 42 operates to drain water from the solar collector through a drain line 43. In addition to this collector drainage means, the freeze protection system 12 comprises control means 44 responsive to the collector liquid temperature $T_c$, a selected freeze protection trigger temperature $T_f$, and the current state of the collector drainage means.

Briefly, the control means 44 activates the water circulating means 18 and actuates the collector drainage means 42 to its normal state, to effect water circulation through the solar collector 14 and storage tank 16, when $T_c > T_f$. Except as noted below, the control means 44 inactivates the circulating means 18 to terminate water circulation through the solar collector 14 and actuates the collector drainage means 42 to its dump state to drain water from the collector, when $T_c \leq T_f$. This inactivation of the water circulating means 18 and actuation of the solar collector drainage means 42 to its dump state constitutes the primary freeze protection mode of the freeze protection system 12.

This primary freeze protection mode may fail due to failure of the solar collector drainge means 42 to assume its dump state and thereby drain the solar collector 14. In this event, the solar collector would again be subject to damage by freezing of water in the collector. For this reason, the redundant freeze protection system 12 is provided with a secondary or back-up freeze protection mode. This secondary protection mode occurs only upon failure of the collector drainage means 42 to assume its dump state in the primary mode in response to the freeze protection trigger condition $T_c \leq T_f$. The secondary protection mode involves continued circulation of water by circulating means 18 through the storage tank 16 and the solar collector 14 to warm the collector. If the collector drainage means 42 does assume its dump state and drain the solar collector 14 in response to the above mentioned freeze protection trigger condition, the water circulating means 18 is inactivated in the primary freeze protection mode and the secondary freeze protection mode is not utilized.

Referring in more detail to the particular freeze protection system 12 illustrated, the solar collector drainage means 42 comprises a two position, three port pilot or solenoid valve 46 connected in the flow line 30 and the drain line 43 with one valve port communicating to the pump outlet 32, a second port communicating to the solar collector inlet 20, and its third port communicating to the drain line 43. In one position of the valve 46, referred to herein as its normal position, the valve port to the drain line 43 is closed and the two remaining valve ports are open to communicate the pump outlet 32 to the collector inlet 20. In the other position of the valve, referred to herein as its dump position, the valve port to the pump outlet 32 is closed and the two remainig valve ports are open, to communicate the collector 14 to the drain line 43.

Connected in the flow line 34 between the solar collector 14 and the storage tank 16 is a check valve 48 which permits water flow from the collector to the tank but blocks reverse flow. Connecting the flow line 34, at a point between the solar collector 14 and the check valve 48, to the flow line 30, at a point between the collector and the collector dump valve 46, is a flow line 50 containing a check valve 52. This check valve permits water flow from line 34 to line 30, essentially in parallel with the collector 14, but blocks reverse flow. The flow line 50, adjacent its junction with the downcomer flow line 34 and upstream of the check valve 52, incorporates an air vent valve 53. A vacuum relief valve 54 is connected to the high point of the system, as shown.

From this description, it is evident that when the water circulating pump 24 is operating, with the dump valve 46 in its normal position, water circulation occurs through the solar collector 14 and the solar energy storage tank 16, as explained earlier. Check valve 52 prevents water from bypassing the solar collector 14 to the flow line 50. This condition of the redundant freeze protection system 12 is referred to herein as its normal mode or state and permits normal operation of the solar water heating system 10.

Actuation of the dump valve 46 to its dump position isolates the solar collector 14 from the pump 24 and communicates the collector to the drain line 43 through the several flow lines 30, 34, 50. Water may then drain from the collector through these lines to the drain lines 43. Check valve 52 opens to permit drain flow through the line 50. The vacuum relief valve 54 opens to vent the high point of the system and thereby permit draining of water from the solar collector. Check valve 48 closes to block water drainage from the storage tank 16. This condition of the freeze protection system 12 is its primary protection mode.

As mentioned earlier, the redundant freeze protection system 12 also comprises a control means 44 for actuating the system in response to the freeze protection trigger condition $T_c \leq T_f$, where $T_c$ is the collector water temperature and $T_f$ is the selected freeze protection trigger temperature level above the freezing point of water. Control means 44 comprises a temperature sensor 56 at the outlet 22 of the solar collector 14, a pressure sensor 58 in the flow line 30 between the collector dump valve 46 and the flow line 50, and an automatic controller 60. Temperature sensor 56 inputs to the controller 60 a signal proportional to the collector outlet temperature ($T_c$). The controller also receives from a reference source 62 a signal input proportional to the selected freeze protection trigger temperature level $T_f$. Controller 60 is connected to the pump 24 and solar collector dump valve 46 and embodies logic for controlling the pump and valve in response to comparisons of the temperatures $T_c$, $T_f$ as follows. When $T_c > T_f$, the controller logic is conditioned to actuate the dump valve 46 to its normal position and to turn on the pump 24, thereby to circulate water through the solar collector 14 and storage tank 16 for storing solar energy in the tank. This is the normal state of the redundant freeze protection system 12.

If desired, the present solar water heating system 10 may embody some or all of the additional control functions of the solar water heating system described in the earlier mentioned co-pending application. For example, the storage tank 16 may contain a temperature sensor 64 responsive to the water temperature $T_w$ in the tank, and the controller logic may control the pump 24 response to the temperatures $T_c$, $T_w$, in the manner explained in the co-pending application, when the freeze protection system 12 is in its above described normal state.

Assume now that the collector temperature $T_c$ drops to or below the freeze protection trigger level $T_f$. When this occurs, the controller 60 logic is conditioned to actuate the collector dump valve 46 to its dump position and to turn off the pump 24, thus to terminate water circulation through and drain water from the solar collector 14. This is the primary protection mode of the redundant freeze protection system 12. If the dump valve 46 actually assumes its dump position and drains the solar collector 14 in response to the temperature condition $T_c \leq T_f$, the secondary or backup freeze protection mode of the redundant freeze protection system is not utilized.

Assume, however, that the collector dump valve 46 is frozen or otherwise stuck in its normal position and thus remains in this position when signalled by the controller 60 to assume its dump position in response to the freeze protection trigger condition $T_c \leq T_f$. The solar collector 14 would thus not drain and hence would be subject to damage by freezing of water in the collector. According to the present invention, the secondary or back-up protection mode of the redundant reeze protection system 12 is activated in response to this malfunction condition (i.e., failure of the dump valve 46 to assume its dump position) in order to prevent such freezing of the water in the collector. This secondary freeze protection mode is triggered or initiated by the pressure sensor 58. To this end, the pressure sensor, which may comprise a simple pressure switch, is designed to input to the controller 60 a high pressure signal when the water pressure at the sensor exceeds ambient atmospheric pressure. The pressure sensor inputs to the collector a low pressure signal when the water pressure at the sensor is less than this static pressure.

Thus, if the collector dump valve 46 assumes its dump position and drains the solar collector 14 in response to the freeze protection signal from the controller 60 when the collector temperature $T_c$ drops to the freeze protection trigger level $T_f$, the pressure sensor 58 inputs a low pressure signal to the controller. The controller 60, in turn, turns off the pump 24 in response to this low pressure signal from the pressure sensor and the freeze protection trigger condition $T_c \leq T_f$. This is the primary protection mode of the freeze protection system 12. On the other hand, if the collector dump valve 46 fails to assume its dump position (i.e., remains in its normal position), in response to the freeze protection signal from the controller 60, or if the drain line 43 is blocked, the pressure sensor 58 will input a high pressure signal to the controller. The controller responds to this high pressure signal and the freeze protection temperature condition $T_c \leq T_f$ by retaining or turning the pump 24 on so as to continue water circulation through the storage tank 16 and the solar collector 14. This circulation of water through the solar collector effects warming of the collector by heat from the storage tank and thus prevents freezing of water in the collector.

I claim:

1. The method of redundant freeze protection for a solar heating system containing a heat transport liquid for circulation through a solar collector and a solar energy storage tank, comprising the steps of:
   sensing the collector liquid temperature,
   actuating a collector drainage means from a normal state which accomodates said liquid circulation to a dump state to drain liquid from said collector in response to the temperature condition $$T_c \leq T_f$$

where $T_c$ equals the collector liquid temperature and $T_f$ equals a selected freeze protection trigger temperature above the liquid freezing point,
   sensing the state of said drainage means, and
   terminating liquid circulation through said collector in response to said temperature condition when said drainage means occupies said dump state and continuing liquid circulation through said collector and tank in response to said temperature condition when said drainage means occupy said normal state.

2. The method of claim 1 wherein:
said solar heating system is a solar water heating system and said heat transport liquid is water.

3. The method of claim 1 wherein:
the liquid pressure at a given point in said system varies between a first level when said drainage means occupies said normal state, and a second level when said drainage means occupies said dump state, and
said state sensing step involves sensing said liquid pressure.

4. The method of redundant freeze protection for a solar heating system including a solar collector, a solar energy storage tank, and circulating means having off and on states, and operable in said on state to circulate a heat transfer liquid through said collector and tank, comprising the steps of:
sensing the collector liquid temperature,
actuating a collector dump valve from a normal position which accomodates said liquid circulation by said circulating means to a dump position wherein said valve communicates said collector to a drain line for draining liquid from said collector in response to the freeze protection temperature condition $$T_c \leq T_f$$

where $T_c$ equals said collector liquid temperature and $T_f$ equals a selected freeze protection trigger temperature,
sensing the position of said dump valve, and
actuating said circulating means to its off state in response to said temperature condition when said dump valve occupies said dump position and to said on state in response to said temperature condition when said dump valve occupies said normal position.

5. The method of claim 4 wherein:
said solar heating system is a solar water heating system and said heat transport liquid is water.

6. The method of claim 5 wherein:
the water pressure at a given point in said system varies between a first pressure level when said dump valve occupies its normal position and a second pressure level when said dump valve occupies its dump position, and
said dump valve position sensing step involves sensing said water pressure.

7. In a solar heating system including a solar collector, a solar energy storage tank, and circulating means having off and on states and operable in said on state to circulate a heat transport liquid through said collector and tank, a redundant freeze protection system comprising:
collector drainage means having normal and dump states and operable in said normal state to permit liquid circulation through said collector and tank by circulating means and in said dump state to drain liquid from said collector, and
control means responsive to the collector liquid temperature $T_c$, to a selected freeze protection trigger temperature $T_f$ greater than the liquid freezing temperature, and to the current state of said collector drainage means for (a) actuating said drainage means to its normal state when $T_c > T_f$ and to its dump state when $T_c \leq T_f$, (b) actuating said liquid circulating means to its on state when $T_c > T_f$ or when $T_c < T_f$ and said drainage means occupies its normal state, and (c) actuating said liquid circulating means to its off state when $T_c < T_f$ and said drainage means occupies its dump state.

8. The subject matter of claim 7 wherein:
said solar heating system is a solar water heating system and said heat transport liquid is water.

9. The subject matter of claim 7 wherein:
the water pressure at a given point in said heating system varies between a first pressure level when said drainage means occupies said normal state and a second pressure level when said drainage means occupies said dump state, and
said control means includes means for sensing the state of said drainage means by sensing said liquid pressure.

10. The subject matter of claim 7 wherein:
said collector drainage means comprises a drain line and a dump valve which occupies a normal position in said normal state of said drainage means wherein said valve communicates said collector and circulation means for liquid circulation through said collector and tank, and which occupies a dump position in said dump state of said drainage means wherein said valve communicates said collector and drain line for liquid drainage from said collector through said drain line.

11. The subject matter of claim 10 wherein:
said control means includes means for sensing the state of said drainage means by sensing the position of said dump valve.

12. The subject matter of claim 11 wherein:
the liquid pressure at a given point in said heating system varies between a first pressure level when said dump valve occupies its normal position and a second pressure level when said dump valve occupies its dump position, and
said state sensing means comprises means for sensing said pressure.

13. The subject matter of claim 7 wherein:
said liquid circulating means comprises an outlet flow line leading from the collector outlet, an inlet flow line leading to the collector inlet, and a pump for pumping a heat transport liquid from said outlet line to said inlet line,
said collector drainage means comprises a drain line, and a dump valve in one of said flow lines which is operable to a normal position in said normal state of said drainage means wherein said valve communicates said pump to said solar collector for liquid circulation through said collector, tank, and pump, and to a dump position in said dump state of said drainage means wherein said valve communicates said collector and drain line for liquid drainage from said collector through said drain lines,
the liquid pressure at a given point in one of said flow lines varies between a first pressure level when said dump valve occupies said normal position and a second pressure level when said dump valve occupies said dump position, and
said control means includes means for sensing the state of said drainage means by sensing said pressure.

14. The subject matter of claim 13 wherein:
said dump valve is located in said inlet line between the outlet of said pump and the inlet of said solar collector and includes a first port communicating to said drain line, a second port communicating to said pump outlet, and a third port communicating to said collector inlet, said first valve port only being closed in said normal position of said dump valve and said second valve port only being closed in said dump position of said valve.

15. The subject matter of claim 14 wherein:

said drainage means further comprises a check valve in said outlet line between said solar collector and said storage tank which opens to permit liquid flow from said collector to said tank and closes to block reverse flow, a third flow line connecting said outlet line between said collector and dump valve, a check valve in said third flow line which opens to permit liquid flow from said outlet line to said inlet line and closes to block reverse flow, and a vacuum relief valve communicating with a high point of said solar collector.

16. The subject matter of claim 15 wherein:

said solar heating system is a solar water heating system of the direct type wherein said inlet and outlet lines open directly to the interior of said storage tank, said heat transport liquid is water, and said heating system includes a water supply line opening directly to the interior of said storage tank and a hot water service line leading from the interior of said storage tank.

17. The subject matter of claim 16 wherein:

said pressure sensor is located between said dump valve and said check valve in said outlet line, and said control means includes a temperature sensor for sensing the water temperature in said solar collector, and a trigger temperature reference source.

* * * * *